United States Patent [19]

Heckendorf

[11] Patent Number: 4,867,247
[45] Date of Patent: Sep. 19, 1989

[54] BEDDING PLOW

[76] Inventor: David W. Heckendorf, 61 Jellicoe St., Rockhampton, QLD 4700, Savannah, Ga.

[21] Appl. No.: 95,979

[22] Filed: Sep. 14, 1987

[30] Foreign Application Priority Data

Sep. 12, 1986 [AU] Australia ............................. PH7993

[51] Int. Cl.$^4$ ........................ A01B 5/04; A01B 17/00
[52] U.S. Cl. .................................... 172/573; 172/574; 172/462; 172/701; 172/260.5
[58] Field of Search .............. 172/701, 574, 176, 178, 172/686, 688, 158, 462, 500, 587, 260.5, 573, 572

[56] References Cited

U.S. PATENT DOCUMENTS

| 687,259 | 11/1901 | Packham | 172/462 |
|---|---|---|---|
| 1,808,759 | 6/1931 | Bickerton | 172/260.5 X |
| 1,817,851 | 8/1931 | Shelton | 172/573 X |
| 2,070,425 | 2/1937 | Engel | 172/573 X |
| 2,140,144 | 12/1938 | Silver | 172/500 X |
| 4,131,162 | 12/1978 | Schmitz | 172/574 |
| 4,386,661 | 6/1983 | McCause | 172/125 X |
| 4,422,512 | 12/1983 | Hodgson, Jr. | 172/701 X |

FOREIGN PATENT DOCUMENTS

| 0011714 | of 1908 | Australia | 172/573 |
|---|---|---|---|
| 0246702 | 1/1961 | Australia | 172/573 |
| 0489975 | 2/1976 | Australia | 172/260.5 |
| 0163239 | 5/1921 | United Kingdom | 172/260.5 |

OTHER PUBLICATIONS

Beit Hashitta, "U Shaped Parabolic Subsoiler", Israel, 1-1981.

Primary Examiner—Richard J. Johnson
Assistant Examiner—Jeffrey L. Thompson
Attorney, Agent, or Firm—Cushman, Darby & Cushman

[57] ABSTRACT

A bedding plow providing a plurality of disks as plowing members each independently supported by a rearwardly located bearing supported by a trailing arm, which is supported, in turn, by a pivotal connection perpendicular to a fore to aft alignment of the plow. There is further disclosed for each independently supported disk, a gas-filled shock absorber and the top of the plow has a planar horizontal surface intended to allow the plow to slide without damage if it is caused to be overturned while in use.

7 Claims, 5 Drawing Sheets

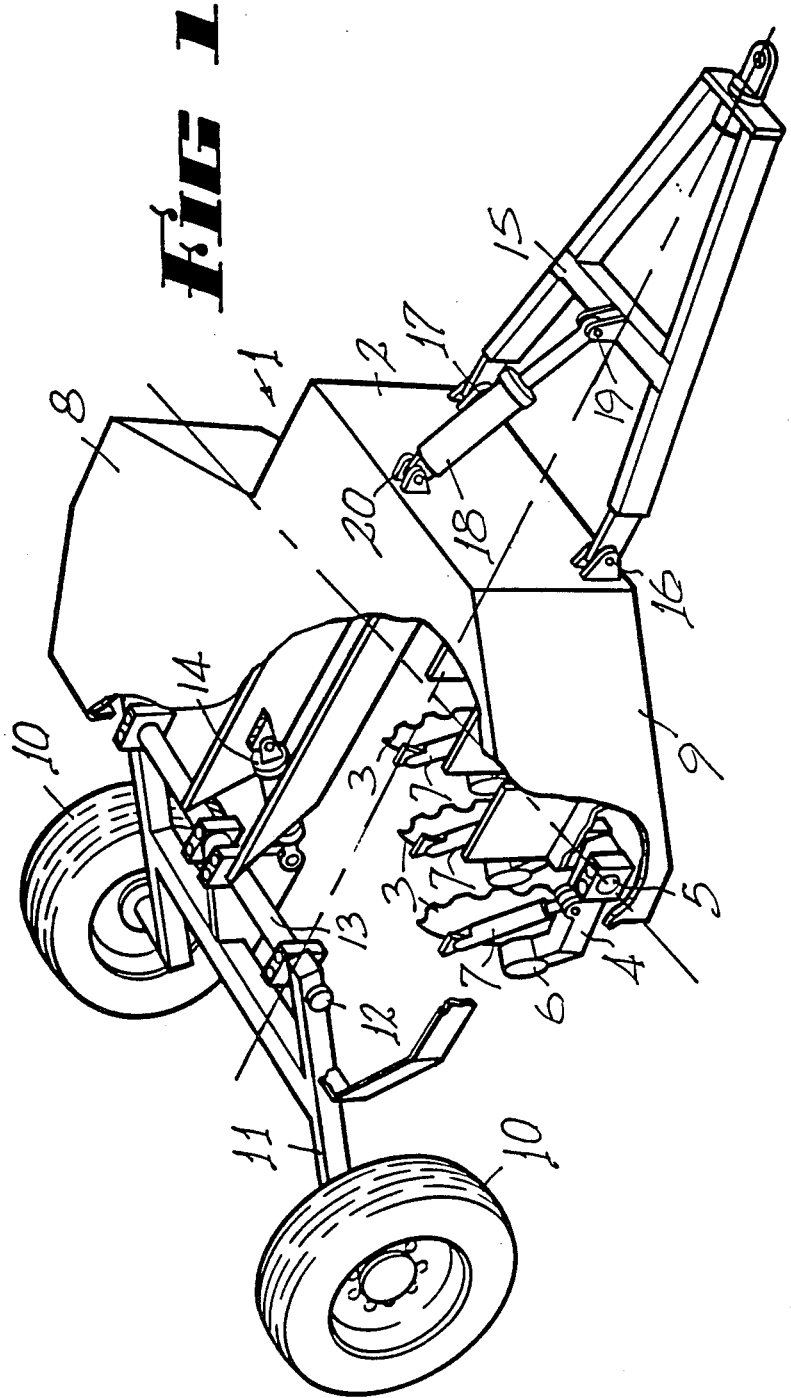

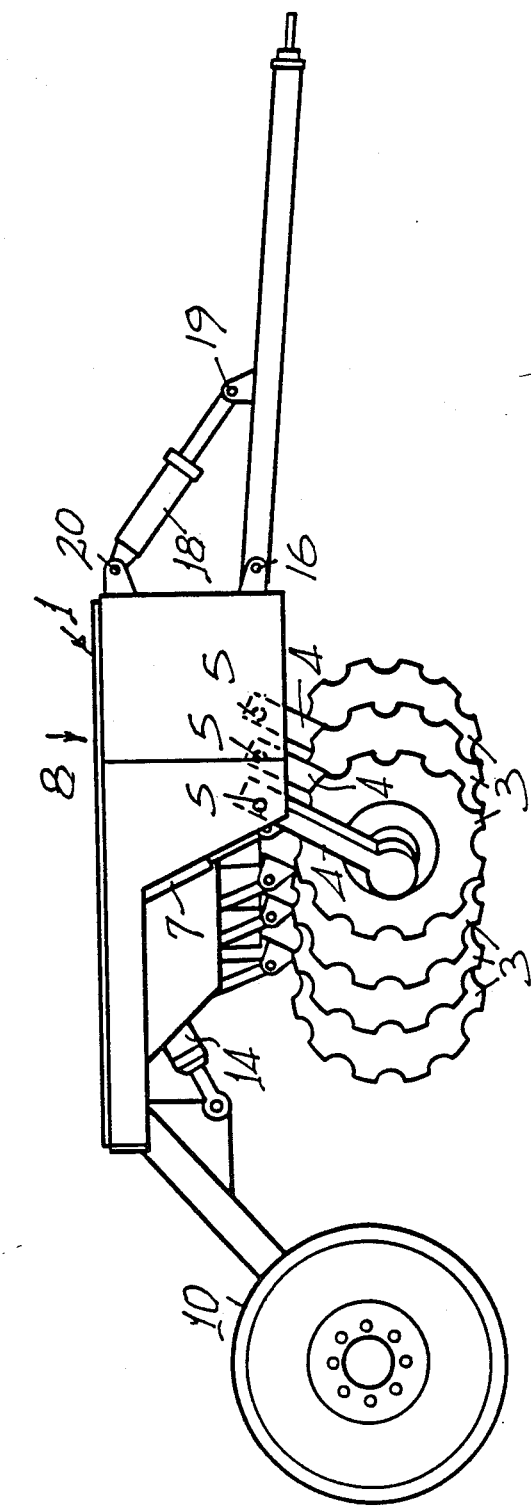

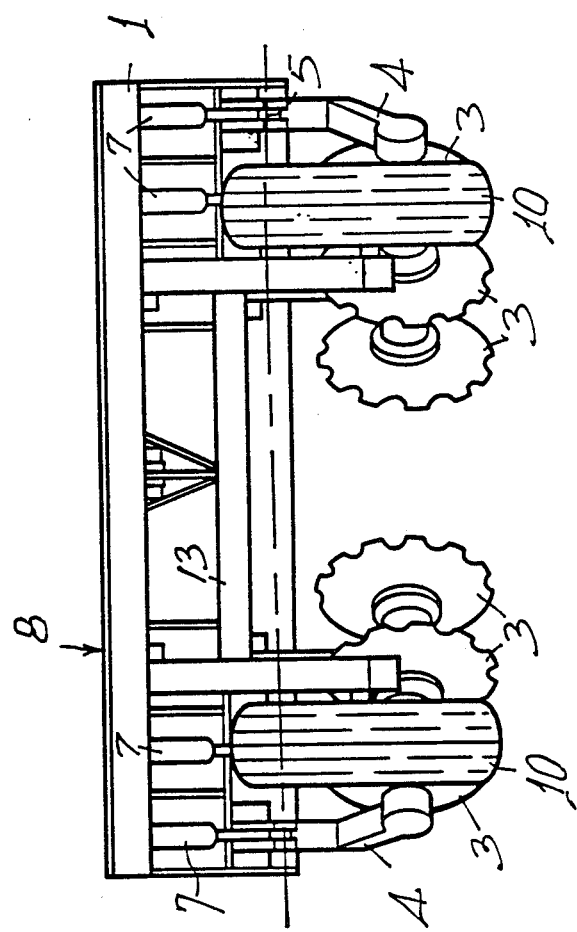

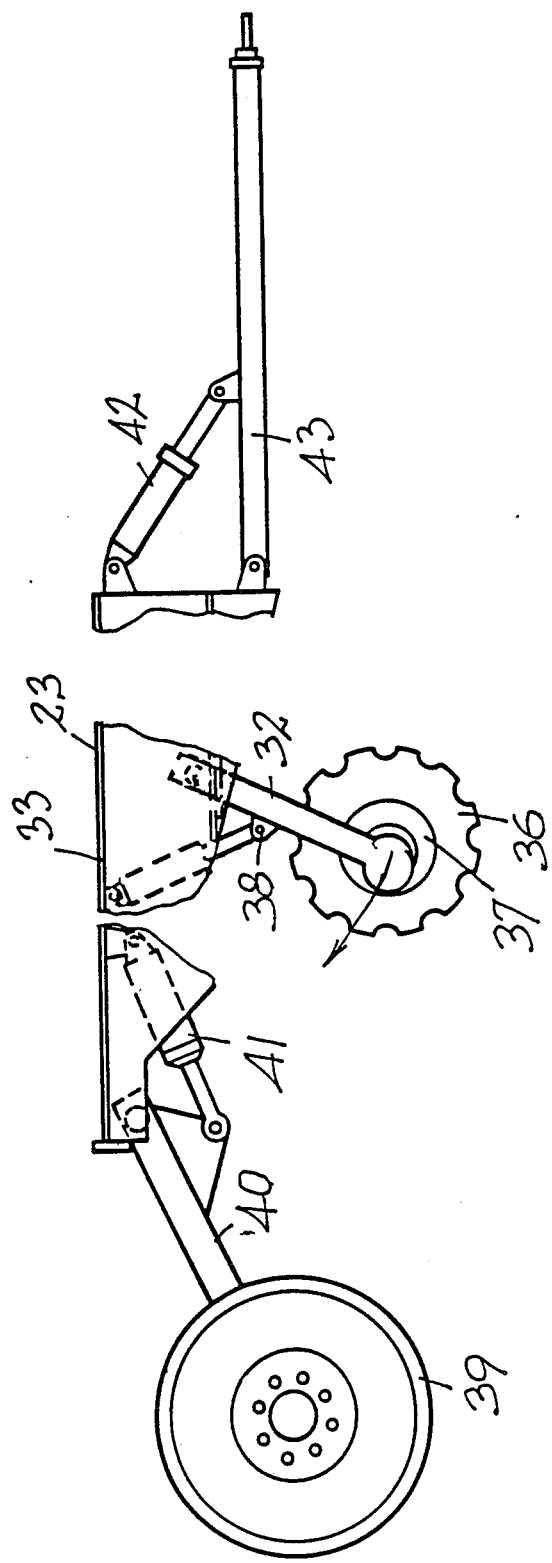

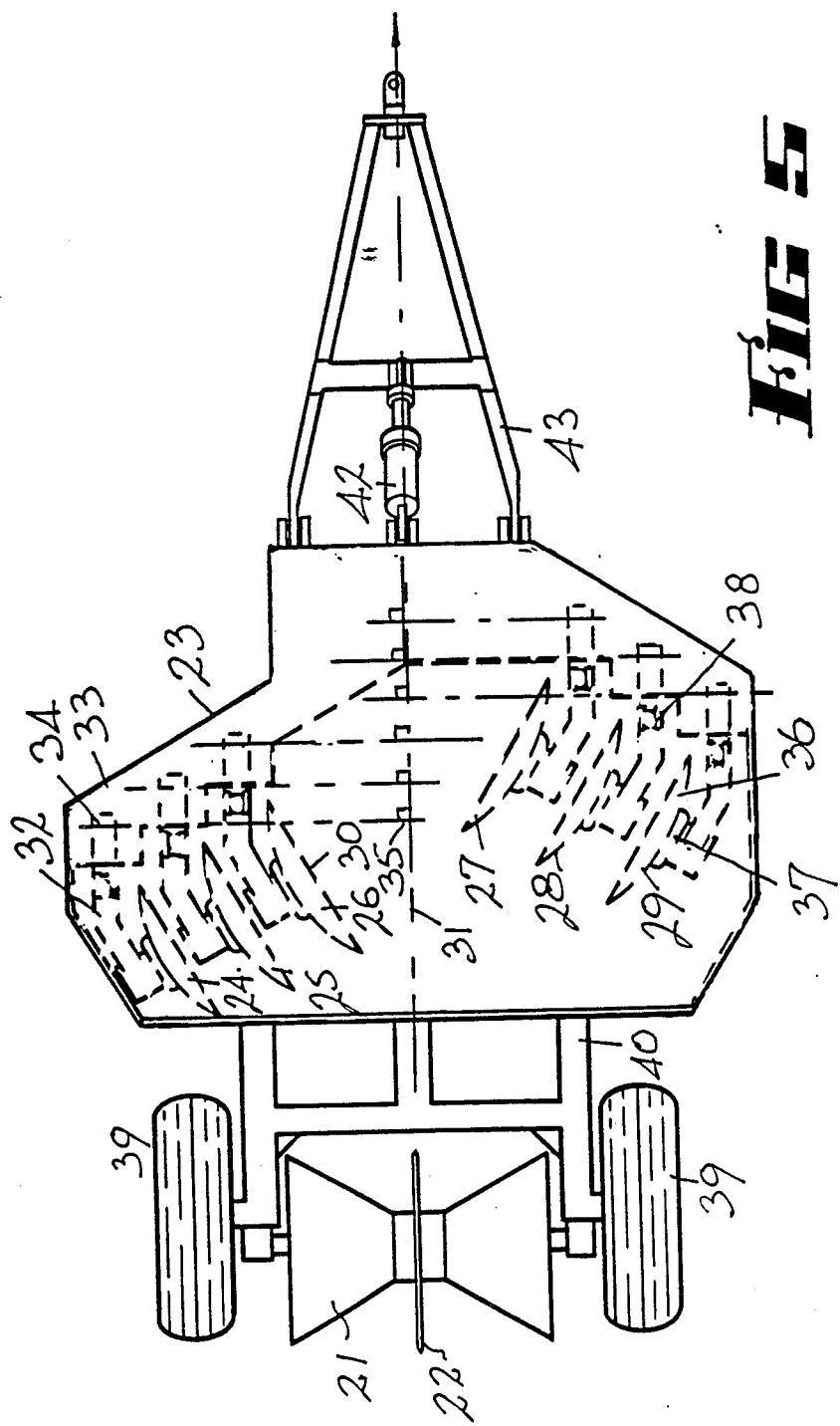

4,867,247

BEDDING PLOW

BACKGROUND OF THE INVENTION

This invention relates to a Bedding Plow and has particular application to a bedding plow.

Bedding plows are used to prepare the ground and plow the ground during a bedding process for growing plants.

Typically then, a bedding plow is used during the planting of young pine trees.

The problem to which this invention is directed relates to the extraordinarily severe conditions under which such plows are expected to operate effectively.

Such ground that is being replanted will, on many occasions, be ground very recently cleared of grown trees and inevitably, the ground is extremely cut-up and very significant quantities of debris and stumps lie either on the surface or within the ground.

Such machines as have hitherto been designed have accordingly been subject to extremely high deterioration, which is both expensive in costs of maintenance and in down-time while the machine is being repaired.

After considerable study of the problems, I have discovered features which collectively allow for significant improvement in the ability of a plow to withstand for a longer time, use in these circumstances.

SUMMARY OF THE INVENTION

The present invention provides a bedding plow including a frame, a plurality of plowing disks, each of said disks being supported for a plowing action by a trailing arm, therebeing one trailing arm for each disk, each of the trailing arms being supported at a forwardmost position to the frame by a connection providing, independent of the other trailing arms, pivotal freedom limited to rotation about an axis aligned substantially transverse to a forward to aft direction of the plow and substantiall horizontal when the plow is supported on a horizontal support surface, each disk being secured to a trailing end of each respective arm by support means allowing rotational freedom of the disk relative to the support arm about an axis which passes through substantially a center of the circular shape of the disk and perpendicular to a plane defined by the circular periphery of the disk, each disk being supported such that the plane defined by the circular periphery is inclined to a forward to aft alignment of the plow, and the support means for each disk being located so that these are located at and attached to a rearwardly-located face of the respective disk.

In preference, each disk is concave on one side and convex on the other, and supported relative to the frame so that the face with the concave shape is fowardmost relative to a fore to aft alignment of the plow.

In preference, there are a plurality of disks, each supported by a trailing arm, the pivot support for each trailing arm having an axis which is staggered with respect to a fore to aft alignment with the plow, with respect to the support axes of the other trailing arms.

By thus supporting each of the plowing disks independently and by supporting these only by means which are located behind the disk, and further by supporting the trailing arm by an axle which has an axis which is substantially transverse to a fore to aft alignment of the plow, means as a first step that most of the dirt being engaged by the disk would be diverted from impinging against a vulnerable bearing area supporting the disk.

If, as has previously been the case, the disks are held collectively, it becomes very much more difficult to reduce access of passing dirt on to the vulnerable mating surfaces, with the almost certain result of extremely high wear and eventual very quick breakdown.

Further, however, considering that these disks are certain in the application, to impact against still imbedded roots and reasonable size stumps, it has been realized that the key to avoiding twisting forces against the disk which would be substantially impossible to resist, is to ensure that the pivot axis of the trailing arm is, in fact, transverse and exactly so to the extent that it is perpendicular to the fore to aft direction that the plow would be expected to travel.

In this way, any impacting of a stump against the disk will almost certainly only have the result of causing this to lift, which of course is a movement the resistance of which is generally only the inertia of the mass of the disk and the relevant part of the trailing arm and, hence, less damage can be expected in each case.

With each independent disk supported in this way, however, it becomes also fundamental that each trailing arm has some stopping arrangement and once again, because of the extremely severe conditions, the discovery is that a shock-absorber such as a gas-filled accumulator provides the solution on a long term basis.

In preference, each of the trailing arms and the disks is of the same size and shape and can therefore replace one antoher, thereby avoiding the number of spare parts necessary. In order to provide this digging effect, it is provided that each trailing arm holding a disk is offset in the fore to aft alignment in respect to adjacent disks and, of course, in preference there are three such disks on one side which are shaped to throw dirt into a center alignment and three on the other, offset from the first said three, to throw further dirt into a central alignment.

One of the very significant problems with a plow of this type in the conditions envisaged, is that it can be caused to turn completely over.

Hitherto if this occurred, the exposed frame members were extremely likely to ensnare oncoming stumps so that both the frame and the dragging machinery can all be subject to very extreme forces with the very high likelihood of severe damage.

According to my discovery, the effect of such a machine being caused to turn over can be mitigated by designing the top of the plow so that in fact it will more readily slide over the top of the ground.

In preference, there is accordingly provided a planar top over the plow which provides the uppermost part of the plow with a shape to allow for this effect.

While establishing the depth of a digging implement using separate ground engaging wheels is not of itself new, with the device that is going to be subject to all of the difficulties discussed, it is found that there is significant advantage in providing ground engaging support wheels which are located one to each side of the frame and which are commonly coupled to a common frame which, in turn, is pivotally supported to the frame and there are means to effect a rising or lowering of such a frame.

A common frame, used in this manner, assists significantly in the overall stability of the frame in the conditions of the type discussed.

BRIEF DESCRIPTION OF THE DRAWINGS

For a better understanding, the invention will now be described with the assistance of drawings in which:

FIG. 1 is a partly cut away perspective view of a bedding plow according to a first embodiment.

FIG. 2 is a side elevation of the plow shown in FIG. 1 also according to the first embodiment, and FIG. 3 is a rear view of the plow as in FIGS. 1 and 2 also according to the first embodiment.

FIG. 4 is a schematic view of a second embodiment from a side showing a covered portion and one of the disks, and FIG. 5 is a plan view of the second embodiment showing the arrangement in which an hour-glass roller with a coulter, is added.

DETAILED DESCRIPTION

Referring to FIGS. 1, 2 and 3, there is shown a bedding plow 1 which includes a frame 2 to which a plurality of disks 3 are supported by trailing arms 4.

Each of the trailing arms 4 is independent of the other arms 4 so that each can rise and fall about its pivot support at 5 independently of any pivot action of adjacent arms 4.

Each disk 3 is of a dish-shape so that there is a convex side and a concave side, the location in respect of the plow 1 being such that each of the disks 3 has its concave side on the front face; that is, the face more dominantly on a forward side where the plow 1 is regarded as having a front draft side as compared to a trailing end or in other words, each disk is supported so that the plane defined by the circular periphery is offset to a fore to aft alignment of the plow.

The extent of offset is approximately forty-five degrees while being maintained so that the alignment about a horizontal axis is such that these are substantially vertical.

Each of the disks 3 has an outer perimeter which insofar that it is defining an outermost circular periphery, nonetheless has a plurality of scalloped portions removed from such outer periphery.

Each disk 3 is secured to a trailing end of each respective arm 4 by support means allowing rotational freedom of the disk 3 relative to the support arm 4 about an axis which passes through substantially a center of the circular shape of the disk and perpendicular to a plane defined by the circular periphery of the disk 3. This allows the disk 3 to rotate relatively about its own axis.

Such rotational support is located and aligned such that the said support for each disk 3 is located at and attached to a rearwardly located face of each respective disk 3.

Accordingly, by providing that the bearing and relatively moving surfaces are all located behind the respective disk, this accordingly protects these from the direct oncoming impact of dirt and stumps and other debris and provides for significant improvement in resistance to breakdown.

Each of the forward ends of the trailing arms is supported by a pivot support at 5, the orientation of such is that the pivot axis is perpendicular to a forward to aft alignment of the plow and furthermore is horizontal when the plow 1 is supported on a horizontal surface.

In this way, there will be minimal twisting torque, other than about the pivot axis at 5.

This therefore leaves the convex side of the disk clear of any further supporting devices and therefore free from any abutment or protrusions which could affect ensnaring of debris or soil during the plowing action.

As shown in the drawings, and as specifically shown with the same general dimensions in FIGS. 4 and 5 in the second embodiment, the angular arrangement between the said axis providing the pivot support at 37 is such that substantially the interfaces between the pivot support and the disk are substantially behind any forward face portions of disk 3.

The orientation of each disk 3 is then coupled with the fact that the respective trailing arms 4 are each supported to be independently rotatable about a transverse axis which is, in fact, directly and exactly transversely orientated to the forward or rearward orientation of the plough 1.

Accordingly, each of the trailing arms 4 is so supported and hence will rise and fall about this horizontal transverse axis.

Extending between each trailing arm 3 and the frame 2 is a nitrogen- filled shock absorber 7 which is adapted to provide for both damping resistance as the swing arm swings back and then subsequently lowers again to an operating position.

Each trailing arm is held under resilient pressure of the accumulator shock absorber 7. This resilient pressure can be varied by using hydraulic pressure from a tractor.

There are six disks, three of these arranged on one side and three arranged on the other to act together to provide for the plowing effect useful for providing a bedding action.

One of the great difficulties with a plow of this type is that if it does overturn, it can be damaged.

There is accordingly provided as a part of the frame 2, an uppermost planar portion 8 which provides both to protect the underneath elements, but perhaps more importantly, provides a substantial flat surface whereby, if the plow 1 does overturn, it will simply slide on the dirt without substantial damage to any of the parts.

A skirt 9 extends also around the sides and front of the frame 2.

The height of the frame 1 and hence the respective disks 3 it is supporting, is determined by rearwardly trailing wheels 10. These are supported to define a forward to rearward direction of the plow 1 by being pivotally supported at the end of the trailing frame 11, the trailing frame 11 itself being pivotally supported at about axis 12. This is transversely aligned to forward to aft alignment of the plow because of the relative position of the wheels 10 and the horizontal directly transverse orientation of the shaft 13.

The relative height of the frame 2 is determined relative to the ground - engageable wheels 10 by means of hydraulic cylinder or ram 14, which extends between a part of the trailing frame 11 and the frame 2.

The orientation of the frame 2 and the relative height of this with respect to any towing vehicle is determined by a forwardmost draft frame 15, which has, at a rearwardmost position, pivotal connections at 16 and 17 to the frame 2 about a transverse horizontal axis and the relative orientation of the draft frame relative to the frame 2 is determined by hydraulic rams 18, which extend between pivot connections with the draft frame 15 at 19 and the frame 2 at 20. In FIG. 5, which shows the same arrangement and plan, there is shown the addition of a rearwardly positioned hour-glass shaped roller 21 with a cutting blade coulter 22 adapted to cut fibrous debris and assist in keeping clear such debris from winding around the roller 21 and to leave a clear cut groove for the opener on a mechanical planter of a subsequent operation.

The plow in the second embodiment 23 therefore includes three blades 24, 25 and 26 on the one side and 27, 28 and 29 on the other, in each of these cases, the outer periphery 30 being of circular shape and defining a plane which is aligned and inclined at approximately forty-five degrees to a forward to rearward alignment, as shown at 31, of the plow 23.

Each of the blades 24 through 29 is supported by a trailing arm, shown typically at 32, which, in turn, is supported relative to the frame 33 by a pivot connection, the axis of which is shown at 34, which as will be seen at 35, is precisely perpendicular to the forward to rearward alignment 31.

Likewise, the remainder of the trailing arms are both offset one to the other in a forward to rearward alignment and they are supported by a pivot connection, the axis of which, in each case, is perpendicular to the forward to rearward alignment 31.

Furthermore, in each case, the disk 24, 25, 26, 27, 28 and 29 is held by a bearing which is located so that it is secured to the convex side 36 of the respective disk and this is located on a rearward side so that a bearing such as is shown at 37 is thereby fully protected against oncoming ensnaring stumps or debris.

Each of the trailing arms, such as shown at 32, typically is connected to shock absorbing means through connection, e.g. at 38.

The height of the frame 33 is governed, especially for separate transport, by the relative position of wheels 39, which are commonly supported by frame 40, which is controlled in relative position by hydraulic ram 41.

Additional control of the height of the plow 23 during use can be achieved by use of the hydraulic ram 42 governing the position of draft frame 43 relative to the frame 33.

In normal conditions of working, the wheels 39 can be lifted so that the height of the disks is governed solely by hydraulic ram 42.

Rubber tires may be provided as shown at 10 in FIG. 3 to enable the ground working portions of the implement to be raised above ground level so that the implement may be towed along a road.

From the description, it will be seen that what is provided is a very significantly improved plow which can be used for effecting a bedding for planting, but it is to be emphasized that the plow having such a configuration and such features is also useful for other purposes.

I claim:

1. A bedding plow, comprising:
    a plurality of plowing disks having respective centers and circular peripheries;
    for each said plowing disk, a respective trailing arm supporting the plowing disk for plowing action;
    a frame;
    said frame supporting each said trailing arm at a foremost position of the trailing arm, by a respective pivotal connection;
    a respective resilient means connected between each said trailing arm and said frame;
    each said connection providing the respective trailing arm, independently of the other trailing arms, with pivotal freedom to rotate about a first axis aligned substantially transversally to a forward-to-aft direction of said plow, which axis is substantially horizontal when said plow is supported on a substantially horizontal support surface;
    each disk being secured to a respective trailing end of a respective said arm, by respective support means allowing rotational freedom of the disk relative to the support arm, about a second axis which passes through substantially the center of the respective disk and perpendicular to a respective plane containing the circular periphery of the respective disk;
    each disk being supported such that the respective said plane is inclined to a forward-to-aft alignment of said plow;
    said support means for each said disk being attached to a respective rearwardly facing face of each respective disk;
    said frame having two laterally opposite sides, with said disks being arranged in two sets of three, connected by respective trailing arms to respective sides of said frame; in each said set the respective three disks being staggered so that an outermost disk is rearmost, and an innermost disk is foremost; disk to disk offset being uniform within each set, and corresponding from set to set.

2. The bedding plow of claim 1, wherein:
    each said disk has one concave face and an opposite, convex face and is positioned concave face foremost.

3. The bedding plow of claim 1, wherein the said respective resilient means comprises a shock absorbing means.

4. The bedding plow of claim 1, wherein:
    the foremost disk in one said set has a leading edge which is located rearwardly of a leading edge of the rearmost disk in the other said set.

5. The bedding plow of claim 1, wherein:
    said frame has a substantially planar top surface which is substantially horizontal when said plow is supported on a horizontal surface.

6. The bedding plow of claim 1, further comprising:
    ground engaging wheels; and
    means mounting the ground engaging wheels to the frame for raising and lowering the wheels relative to the frame.

7. The bedding plow of claim 1, wherein:
    said circular peripheries of said disks are scalloped.

* * * * *